US005246807A

United States Patent [19]

Kanemaru et al.

[11] Patent Number: 5,246,807

[45] Date of Patent: Sep. 21, 1993

[54] ELECTROPHOTOGRAPHIC PHOTOSENSITIVE MEMBER, AND ELECTROPHOTOGRAPHIC APPARATUS, DEVICE UNIT, AND FACSIMILE MACHINE EMPLOYING THE SAME

[75] Inventors: Tetsuro Kanemaru, Tokyo; Hideyuki Takai; Itaru Yamazaki, both of Yokohama; Shinya Mayama, Yamato; Masato Tanaka, Kawasaki, all of Japan

[73] Assignee: Canon Kabushiki Kaisha, Tokyo, Japan

[21] Appl. No.: 923,470

[22] Filed: Aug. 3, 1992

[30] Foreign Application Priority Data

Aug. 5, 1991 [JP] Japan ................................ 3-218106

[51] Int. Cl.$^5$ ..................... G03G 5/147; G03G 15/22; H04N 1/23

[52] U.S. Cl. ...................................... 430/58; 430/66; 430/67; 430/59; 430/96; 355/211; 358/300; 358/302

[58] Field of Search ............................ 430/58, 66, 67; 355/211; 358/300, 302

[56] References Cited

U.S. PATENT DOCUMENTS

| | | | |
|---|---|---|---|
| 4,681,922 | 7/1987 | Schmidt et al. | 525/474 |
| 4,732,949 | 3/1988 | Paul et al. | 525/464 |
| 5,132,197 | 7/1992 | Iuchi et al. | 430/76 |

FOREIGN PATENT DOCUMENTS

| | | |
|---|---|---|
| 0146827 | 7/1985 | European Pat. Off. . |
| 0429116 | 5/1991 | European Pat. Off. . |
| 3506472 | 8/1986 | Fed. Rep. of Germany . |
| 61-217050 | 9/1986 | Japan . |
| 62-67094 | 3/1987 | Japan . |
| 63-218768 | 9/1988 | Japan . |
| 63-239248 | 10/1988 | Japan . |
| 64-17066 | 1/1989 | Japan . |
| 3-128973 | 5/1989 | Japan . |

OTHER PUBLICATIONS

Patent Abstracts of Japan, vol. 10, No. 327 (P-513) [2383] for 61-132945, published Jun. 20, 1986.

*Primary Examiner*—Roland Martin
*Attorney, Agent, or Firm*—Fitzpatrick, Cella, Harper & Scinto

[57] ABSTRACT

The present invention relates to an electrophotographic photosensitive member. The photosensitive member has an electroconductive support and a photosensitive layer formed thereon containing oxytitanium phthalocyanine, and a surface layer of the photosensitive member contains a copolymer having a first and second structural units represented by the formulas

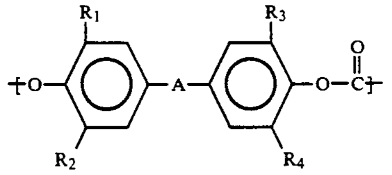

(I)

and

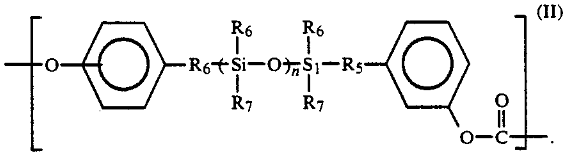

(II)

Further the invention relates to an electrophotographic apparatus, device unit, and facsimile machine utilizing the electrophotographic photosensitive member.

32 Claims, 5 Drawing Sheets

ELECTROPHOTOGRAPHIC PHOTOSENSITIVE MEMBER, AND ELECTROPHOTOGRAPHIC APPARATUS, DEVICE UNIT, AND FACSIMILE MACHINE EMPLOYING THE SAME

BACKGROUND OF THE INVENTION

1. Field of the Invention

The present invention relates to an eleotrophotographic photosensitive member which comprises a photosensitive layer containing a specified charge-generating substance, and a resin having a specified structure. The present invention also relates to an electrophotographic apparatus, a device unit, and a facsimile machine, employing the electrophotographic photosensitive member.

2. Related Background Art

Known organic photoconductive substances useful for electrophotographic photosensitive members include photoconductive polymers such as poly-N-vinylcarbazole, and low-molecular organic photoconductive substances such as oxadiazoles and azo pigments. Electrophotographic photosensitive members employing an organic photoconductive substance have advantages of non-pollution, very high productivity, relative inexpensiveness, and so forth. The sensitivity range of the photosensitive members can be relatively readily controlled by selection of the substance employed. Accordingly, use of the organic photoconductive substances have been comprehensively studied for electrophotographic members. Conventional organic electrophotographic photosensitive members were considered to be defective in sensitivity and durability. However, in recent years, the sensitivity and the durability thereof have been remarkably improved as the result of the development of function-separation type photosensitive members which are constituted of a charge-generating layer containing a charge generating substance laminated to a charge-transporting layer containing a charge-transporting substance.

On the other hand, non-impact type printers which utilize the electrophotography technique have come to be widely used as a terminal printer in place of conventional impact type printers. Most of such non-impact type printers are laser beam printers employing a laser light as the irradiation light source. In most cases, semiconductor lasers are used for the laser light source in view of the cost and the size of the apparatus. The semiconductor laser emits light of wavelength as long as 790±20 nm. Therefore, electrophotographic photosensitive members are now being investigated which have sufficient sensitivity to light of such a long wavelength.

Phthalocyanine compounds are extremely effective as the charge-generating substance sensitive to light of such long wavelengths. In particular, oxytitanium phthalocyanine has excellent sensitivity characteristics in comparison with usual. phthalocyanine compounds. Various crystal forms of highly sensitive oxytitanium phthalocyanine are disclosed in literature such as Japanese Patent Application Laid-Open Nos. 61-239248, and 61-217050, Japanese Patent Publication No. 62-67094, Japanese Patent Application Laid-Open Nos. 63-218768, and 64-17066.

However, electrophotographic photosensitive members employing oxytitanium phthalocyanine, which have excellent sensitivity characteristics, are liable to cause charge injection from the support at a high temperature and a high humidity. Particularly when used in a reversal development type of electrophotographic apparatus, this type of photosensitive member is liable to cause spot-shaped fogging (hereinafter referred to as "black spots") in non-printed areas of a printed image. Further, the photosensitive member is liable to cause variation of a light area potential on repeated use.

To meet the demand for high quality of images and durability of the members in recent years, electrophotographic photosensitive members were investigated which are capable of providing high-quality images stably.

SUMMARY OF THE INVENTION

An object of the present invention is to provide an electrophotographic photosensitive member which has high sensitivity characteristics, particularly to the long wave region of light such as light emitted from a semiconductor laser.

Another object of the present invention is to provide an eleotrophotographic photosensitive member which has excellent potential characteristics stable even at a high temperature and which high humidity, and causes no image defects like black spots even when applied to a reversal development type of electrophotographic apparatus.

A further object of the present invention is to provides an electrophotographic apparatus, a device unit, and a facsimile machine employing the above electrophotographic photosensitive member.

The present invention provides an eleetrophotographic photosensitive member comprising an electroconductive support and a photosensitive layer formed thereon, the photosensitive layer containing oxytitanium phthalocyanine, and a surface layer of the photosensitive member containing a copolymer having a first structural unit represented by the structural formula [I]:

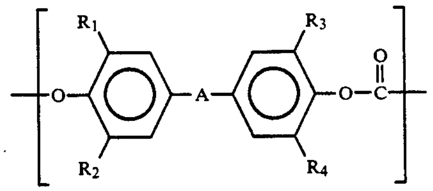

[I]

where A is a linear, branched or cyclic alkylidene group, an aryl-substituted alkylidene group, an arylenedialkylidene group, or a group of —O—, —S—, —CO—, —SO—, or —SO—, the alkylidene group having 1 to 10 carbon atoms; $R_1$, $R_2$, $R_3$, and $R_4$ are each hydrogen, halogen, or an alkyl or alkenyl group having 1 to 4 carbon atoms, and a second structural unit [II]:

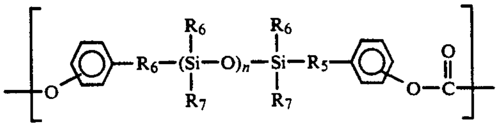

[II]

where $R_5$ is an alkylene or alkylidene group having 2 to 6 carbon atoms; $R_6$ and $R_7$ are each an alkyl group having 1 to 3 carbon atoms, a phenyl group, or a substituted phenyl group; n is an integer of from 1 to 200.

The present invention also provides an electrophotographic apparatus, a device unit, and a facsimile machine employing the above electrophotographic photosensitive member.

DESCRIPTION OF THE PREFERRED EMBODIMENT

Figure 1:
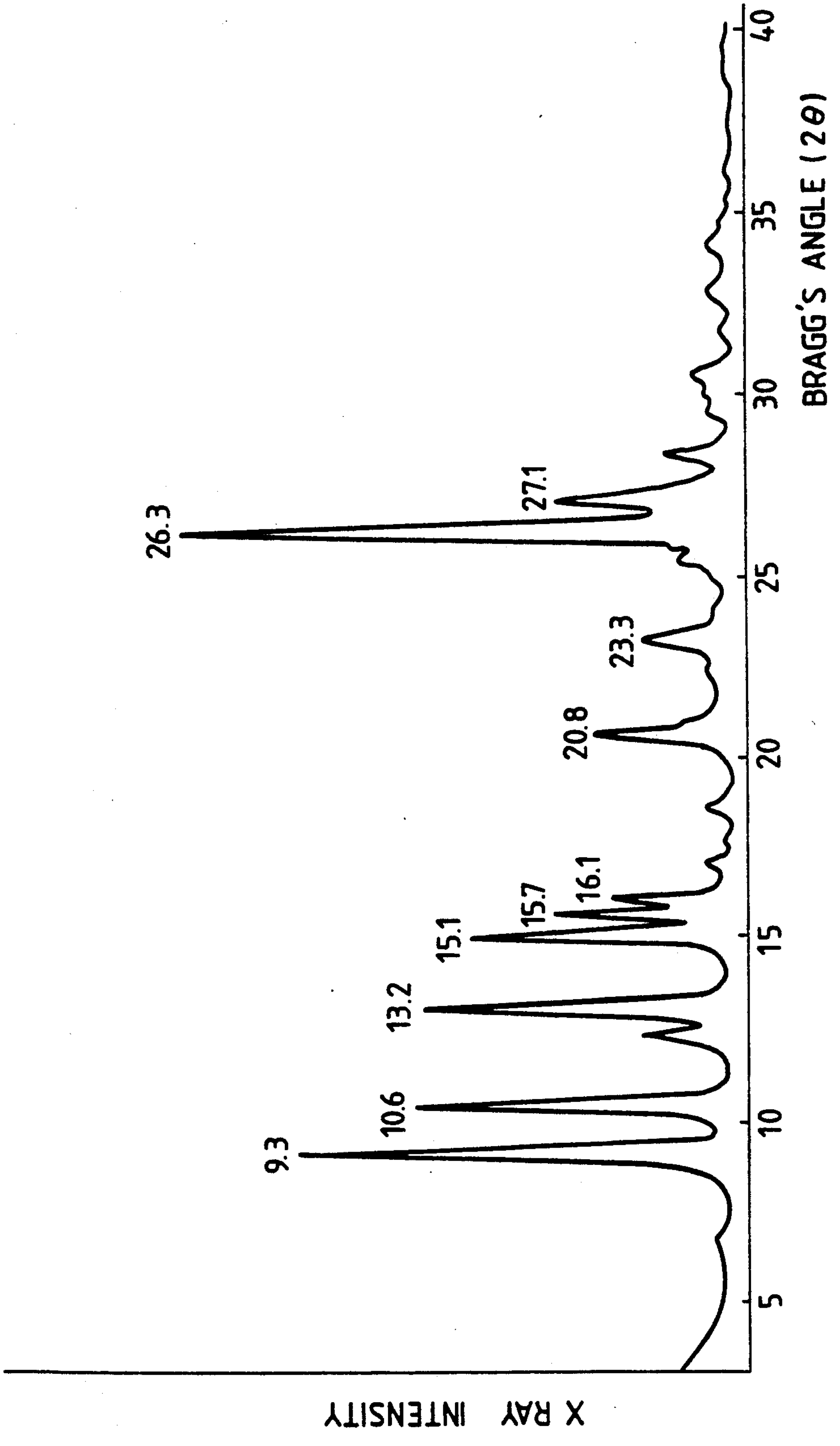
FIG. 1 shows a CuKα characteristic X-ray diffraction pattern of an A type oxytitanium phthalocyanine crystal.
Figure 2:
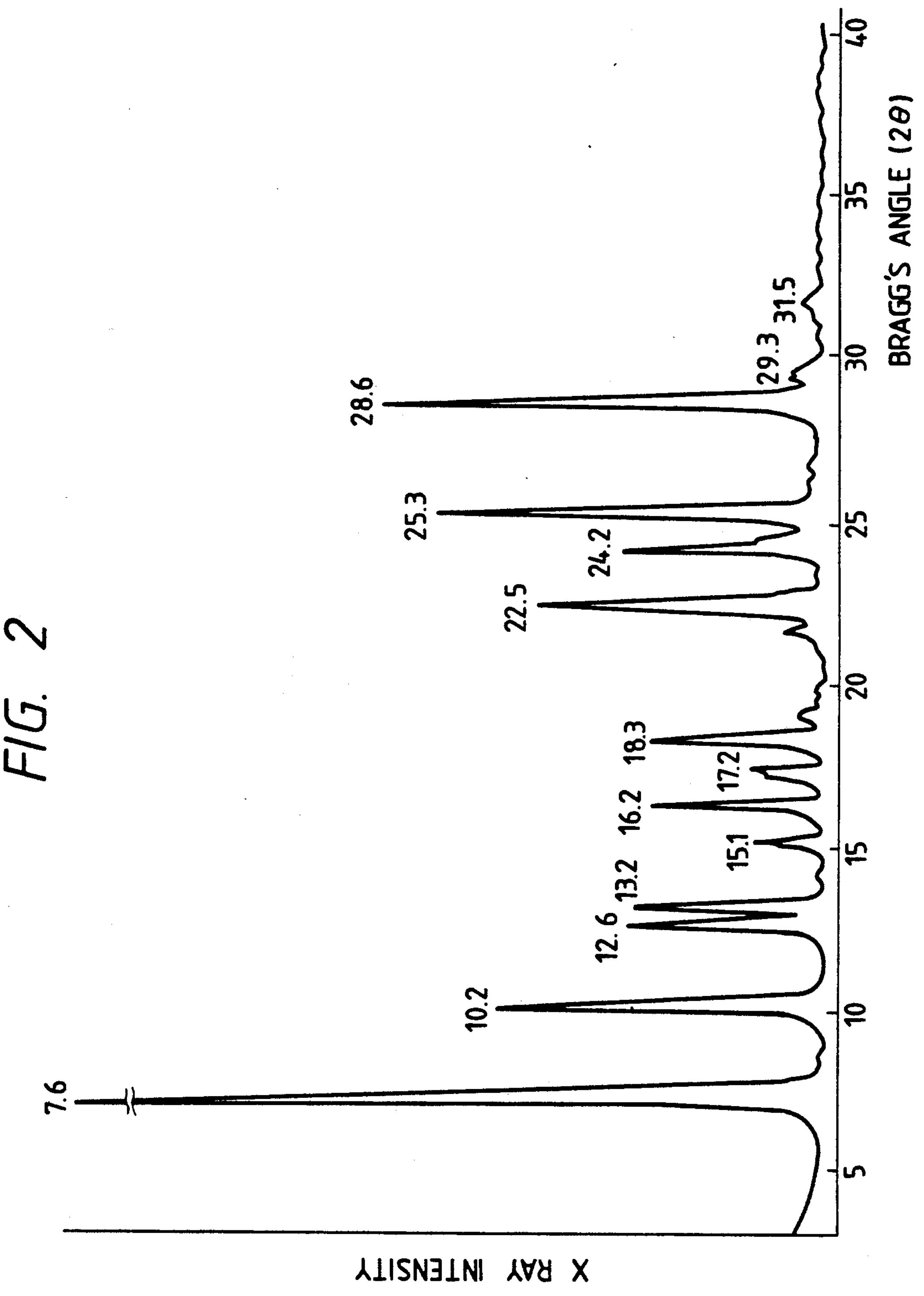
FIG. 2 shows a CuKα characteristic X-ray diffraction pattern of an B type oxytitanium phthalocanine crystal.
Figure 3:
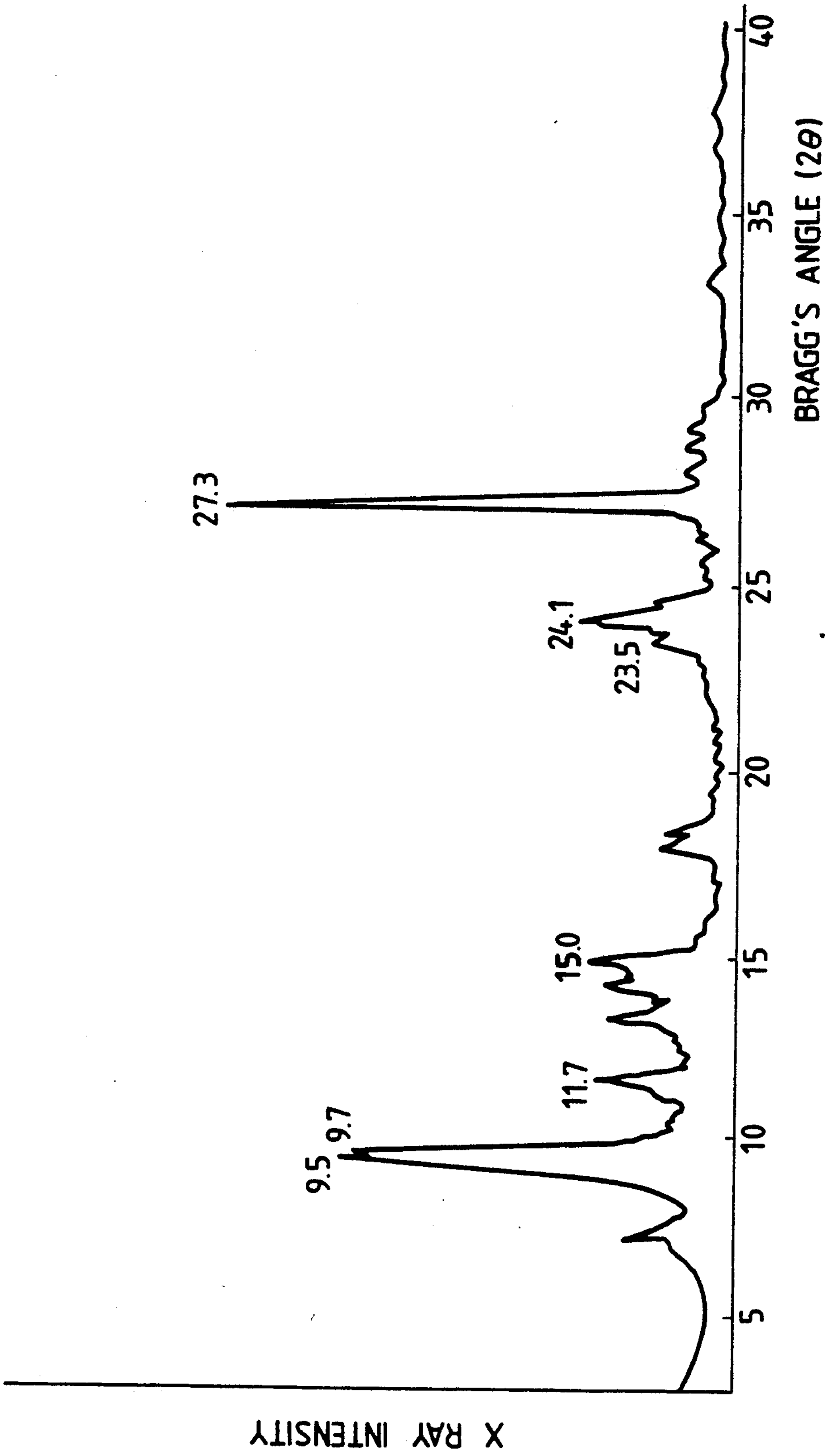
FIG. 3 shows a CuKα characteristic X-ray diffraction pattern of an Y type oxytitanium phthalocyanine crystal.
Figure 4:
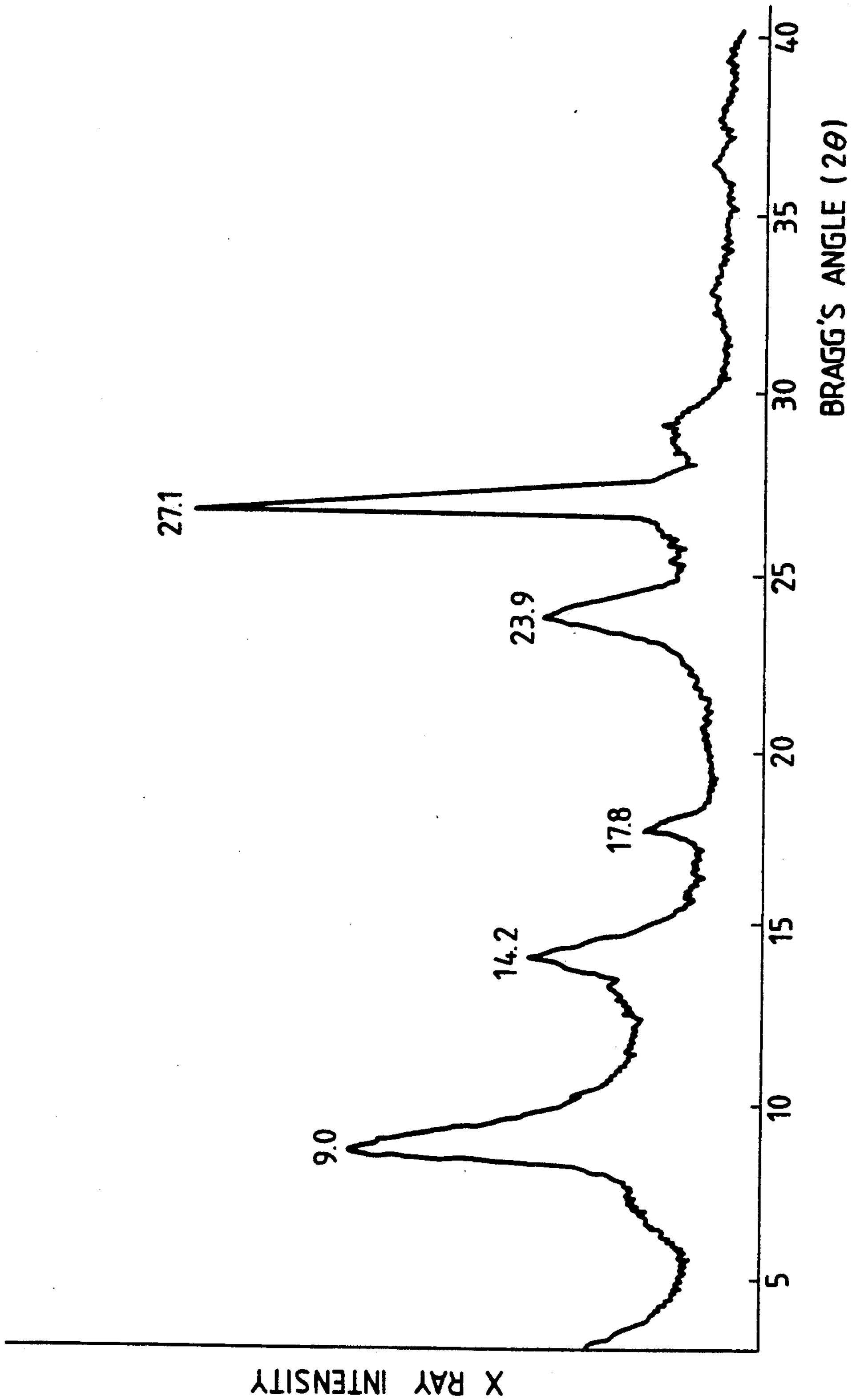
FIG. 4 shows a CuKα characteristic X-ray diffraction pattern of an I type oxytitanium phthalocyanine crystal.

The electrophotographic photosensitive member of the present invention has a photosensitive layer which contains oxytitanium phthalocyanine and a copolymer having a first structural unit represented by the structural formula [I]:

[I]

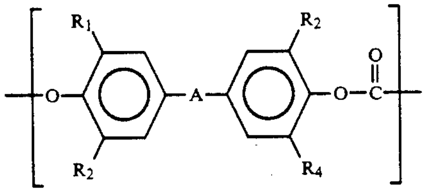

where A is a linear, branched or cyclic alkylidene group, an aryl-substituted alkylidene group, an arylene-dialkylidene group, or a group of —O—, —S—, —CO—, —SO—, or —$SO_2$—, the alkylidene group having 1 to 1O carbon atoms; $R_1$, $R_2$, $R_3$, and $R_4$ are each hydrogen, halogen, or an alkyl or alkenyl group having 1 to 4 carbon atoms, and a second structural unit [II]:

[II]

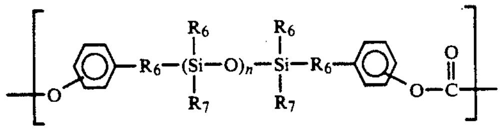

where $R_5$ is an alkylene or alkylidene group having 2 to 6 carbon atoms; $R_6$ and $R_7$ are each an alkyl group having 1 to 3 carbon atoms, a phenyl group, or a substituted phenyl group; n is an integer of from 1 to 200.

The structure of oxytitanium phthalocyanine used in the present invention is shown below:

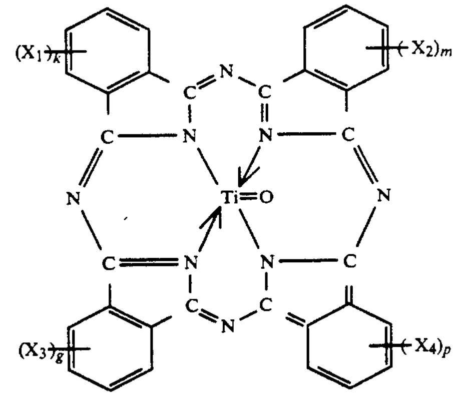

where $X_1$, $X_2$, $X_3$, and $X_4$ are each chlorine or bromine; and k, m, p, and q are each an integer of from 0 to 4.

Oxytitanium phthalocyanine is known to vary in characteristics depending on its crystal form. In the present invention, however, amorphous or any known among them, crystal forms preferable in the present invention include A type crystal exhibiting strong peaks at Bragg angles (2θ±0.2°) of 9.3°, 10.6°, 13.2°, 15.1°, 15.7°, 16.1°, 20.8°, 23.3°, 26.3°, and 27.1°in X-ray diffraction such as those described in Japanese Patent Application Laid-Open No. 62-67094; B type crystal exhibiting such strong peaks at Bragg angles (2θ±0.2°) of 7.5°, 12.3°, 16.3°, 25.3°, and 28.7° in X-ray diffraction such as those described in Japanese Patent Application Laid Open No. 61-239248; Y type crystal exhibiting strong peaks at Bragg angles (2θ±0.2°) of 9.5°, 9.7°, 11.7°, 15.0°, 23.5°, 24.1°, and 27.3° in X-ray diffraction such as those described in Japanese Patent Application Laid-Open No. 64-17066; and I type crystal exhibiting strong peaks at Bragg angles (2θ±0.2°) of 9.0°, 14.2°, 23.9°, and 27.3° in X-ray diffraction such as those described in Japanese Patent Application Laid-Open No. 3-128973. From among them, the I type crystal is particularly preferred. CuKα characteristic X-ray diffraction patterns of A type, B type, Y type, and I type of oxytitanium phthalocyanine are shown respectively in FIG. 1, FIG. 2, FIG. 3, and FIG. 4.

The copolymer employed in the present invention may be of any molecular weight provided that he copolymer has a viscosity suitable for forming a coating film of a desired thickness. In view of mechanical properties of the coating film, the copolymer has preferably a viscosity-average molecular weight in a range of from 10,000 to 100,000, more preferably from 20,000 to 40,000.

The copolymer used in the present invention be prepared by interfacial polymerization of a bisphenol having the structure of Formula [III] ($R_1$ to $R_4$ being the same as defined before):

[III]

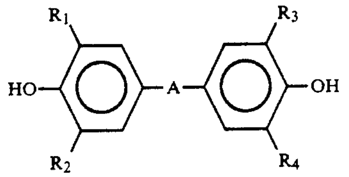

and another bisphenol having the structure of Formula [IV] ($R_5$ to $R_7$ being the same as defined before):

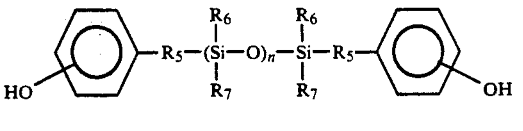

[IV]

in the presence of phosgene, a carbonate ester, or chloroformate.

The structure unit represented by Formula [II] in the present invention is preferably contained in the copolymer in a range of from 0.1 to 50% by weight, more preferably from 0.1 to 30 % by weight formula, n is an integer of from 1 to 200, preferably from 5 to 100. $R_5$ includes ethylene, propylene, isopropylene, butylene, and pentylene, among which ethylene, propylene, and isopropylene are particularly preferred.

Specific examples of the preferable bisphenols represented by Formula [III] are shown without limiting the invention thereto.

| No. | Exemplified Compounds: |
|---|---|
| 1 | 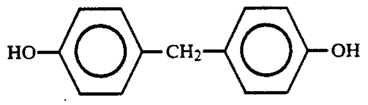 |
| 2 | 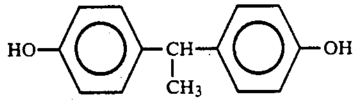 |
| 3 | 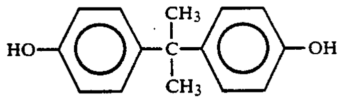 |
| 4 | 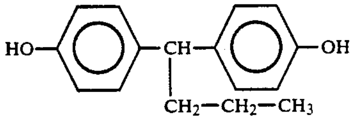 |
| 5 | 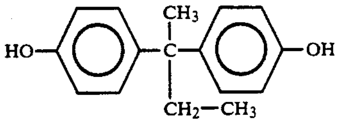 |
| 6 | 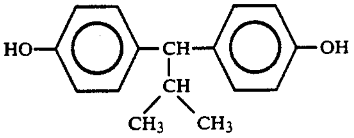 |
| 7 | 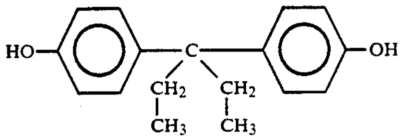 |

-continued

| No. | Exemplified Compounds: |
|---|---|
| 8 | 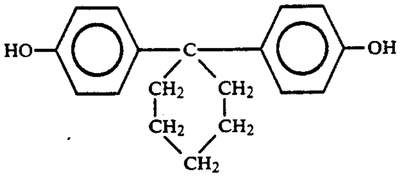 |
| 9 | 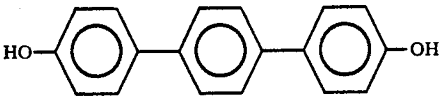 |
| 10 | 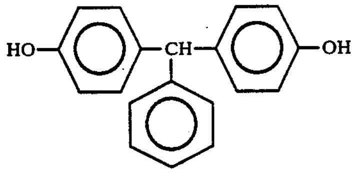 |
| 11 | 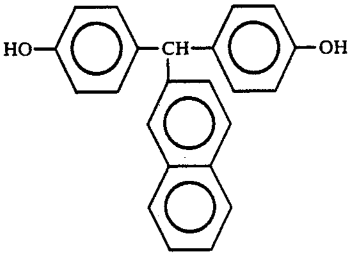 |
| 12 | 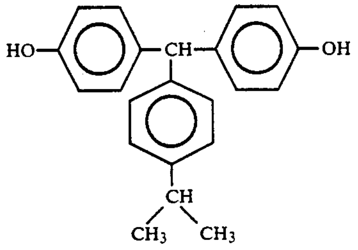 |
| 13 | 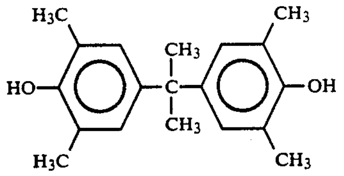 |
| 14 | 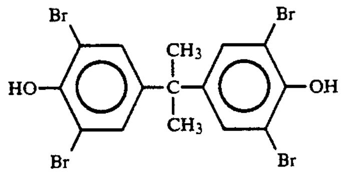 |
| 15 | 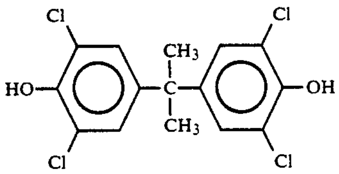 |

-continued
| No. | Exemplified Compounds: |
|---|---|
| 16 | 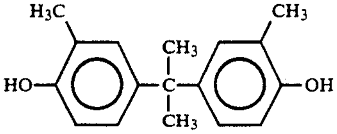 |
| 17 | 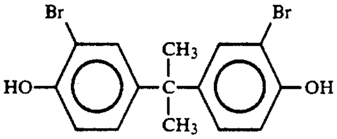 |
| 18 | 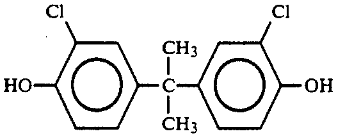 |
| 19 | 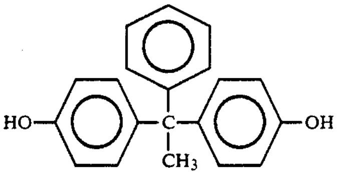 |
| 20 | 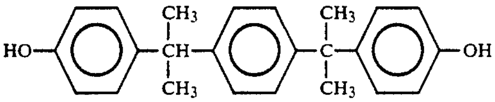 |
| 21 | 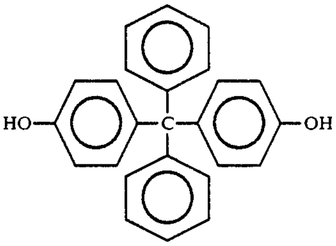 |
-continued
| No. | Exemplified Compounds: |
|---|---|
| 22 | 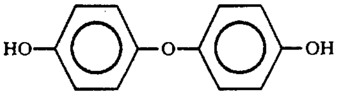 |
| 23 | 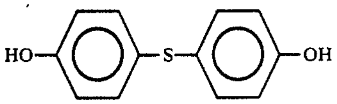 |
| 24 | 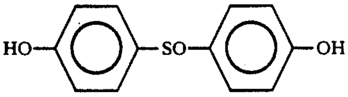 |
| 25 | 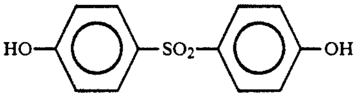 |
| 26 | 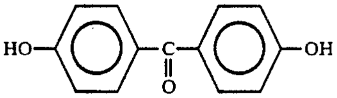 |
Among the above compounds, Exemplified Compounds of Nos. 3, 8, 16, 19, and 21 are preferred, those of Nos. 3 and 8 being particularly preferred.
Specific examples of the preferably bisphenols represented by Formula [IV] are shown without limiting the invention thereto.
| No. | Exemplified Compounds: |
|---|---|
| 27 | 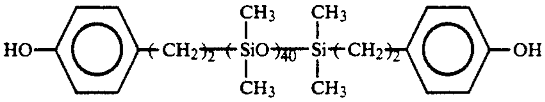 |
| 28 | 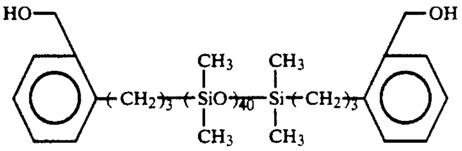 |
| 29 | 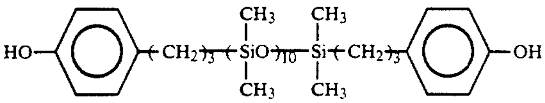 |

-continued

| No. | Exemplified Compounds: |
|---|---|
| 30 | 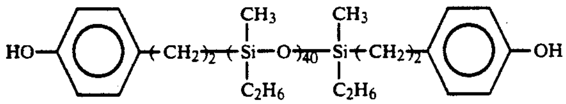 |
| 31 | 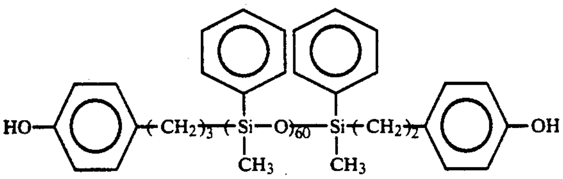 |
| 32 | 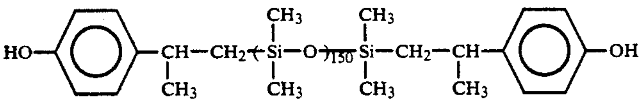 |
| 33 | 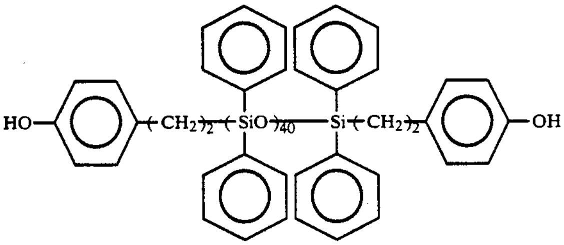 |

SYNTHESIS EXAMPLES

In 45 liters of water, 3.8 kg of sodium hydroxide was dissolved, and thereto were added, at a temperature of 20°C., 7.2 kg of 2,2-bis(4-hydroxyphenyl) cyclohexane (viscosity-average molecular weight $2.20\times10^4$) 1.5 kg of a polydimethylsiloxane derivative (X-22-165B, made by Shin-Etsu Chemical Co., Ltd.) of the structural formula below:

(Formula)

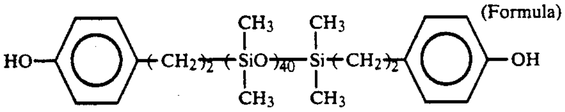

and 8 g of hydrosulfite (sodium dithionite), and dissolved. Further thereto, 32 liters of methylene chloride was added. With stirring, 158 g of p-t-butylphenol was added, and then 3.5 kg of phosgene was blown in over 60 minutes.

After completion of blowing of the phosgene, the reaction mixture was emulsified by vigorous stirring. To the emulsion, 8 g of triethylamine was added, and polymerization was allowed to proceed for about one hour.

Subsequently, the polymerixation mixture was separated into an aqueous layer and an organic layer. The organic layer was neutralized with phosphoric acid, and then washed with water repeatedly until the pH of the washing water became neutral. Then 35 liters of isopropanol was added to precipitate the polymerization product. The precipitate was collected by filtration and was dried to obtain a powdery white copolymer shown by the structural formula below (the copolymerization ratio being based on weight) and having a viscosity-average molecular weight of $2.8\times10^4$. The composition ratio was determined by infrared absorption spectrometry.

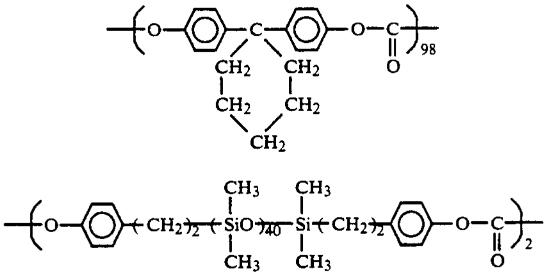

By use of the copolymer of the present invention, a film was obtained which exhibited satisfactory water-repellency and lubricity without impairing the electrical and mechanical properties thereof. Moreover, the copolymer is highly soluble in conventional solvents such as tetrahydrofuran, dioxane, cyclohexanone, benzene, toluene, xylene, monochlorobenzene, dichloromethane, dichlorobenzene, and mixtures thereof, and does not cause decrease of the pot life nor gelation of the solution resulting therefrom. Therefore, the copolymer has excellent properties in respect of electrophotographic properties, production stability and product quality stability.

The copolymer used in the present invention may be constituted of two or more comonomer components of Formula [I], and may similarly be constituted of two or more comonomer components of Formula [II], and further may be constituted of additional comonomer component other than those of Formulas [I]and [II].

Furthermore, in the present invention, two or more copolymers of the present invention may be used in combination, or the copolymer of the present invention may be used in combination with another resin. The resin which may be combinedly used includes polyester resins, acrylic resins, polyethylene resins, polypropylene resins, polyvinylcarbazole resins, phenoxy resins, polycarbonate resins, polyvinylbutyral resins, polystyrene resins, polyvinyl acetate resins, polysulfone resins, polyarylate resins, and vinylidene chloride-acrylonitrile copolymer resins.

The photosensitive layer of the present invention may be of a single layer type in which the charge-generating substance composed of oxytitanium phthalocyanine and the charge-transporting substance are contained in one and the same layer, or may be of a lamination type in which the functions are performed by separate layers of a charge generation layer Containing oxytitanium phthalocyanine and a charge-transporting layer containing a charge-transporting substance. However the lamination type of photosensitive layer is more preferable.

The charge-generating layer may be prepared by dispersing oxytitanium phthalocyanine in a suitable resin by use of a solvent, applying this liquid dispersion, and drying it. Otherwise the layer may be formed by vapor deposition without using a resin. In the case where the charge-generating layer constitutes the surface layer, the resin employed for this purpose contains at least the copolymer having the components of Formulas [I] and [II] of the present invention. In the case where the charge-generating layer is not the surface layer, another resin may be used instead of the copolymer of the present invention, including polyesters, acryl resins, polyvinylcarbazole, phenoxy resins, polycarbonates, polyvinylbutyral, polyvinylbenzal, polystyrene, polyvinyl acetate, polysulfone, polyarylate, vinylidene chloride-acrylonitrile copolymers, and the like.

The oxytitanium phthalocyanine employed in the present invention may be a mixture of different crystal forms of oxytitanium phthalocyanine, or may be used together with another charge-generating substance different from oxytitanium phthalocyanine.

The charge-generating layer contains the resin preferably in an amount ranging from 20 to 80 % by weight, more preferably from 30 to 60 % by weight, based on the total weight of this layer, and has preferably a film thickness of not more than 5 μm, more preferably in a range of from 0.05 to 2 μm.

The charge-transporting substance contained in the charge-transporting layer includes compounds of triarylamines, hydrazones, stilbenes, pyrazolines, oxadiazoles, thiazoles, and triarylmethanes. The charge-transporting substances are generally deficient in film-forming properties. Therefore, the charge-transporting substance is used in a form of a solution in a suitable resin. In the case where the charge-transporting layer constitutes the surface layer of the photosensitive member, the resin employed for this purpose contains at least the copolymer of the present invention. In the case where the charge-transporting layer is not the surface layer, another resin may be used instead of the copolymer of the present invention. The resin includes those mentioned above. The charge-transporting layer may be formed by dissolving the aforementioned charge-transporting substance and the resin in a suitable solvent, applying the solution, and drying the applied solution. The charge-transporting layer contains the resin preferably in an amount ranging from 20 to 80 % by weight, more preferably from 30 to 60 % by weight, based on the total weight of this layer, and has preferably a film thickness ranging from 5 to 40 μm, more preferably from 10 to 30 μm.

The single layer type photosensitive layer may be prepared by dispersing and dissolving oxytitanium phthalocyanine and the aforementioned charge-transporting substance in a resin, and applying and drying the solution. In the case where the photosensitive layer is the surface layer of the photosensitive member, the resin employed for this purpose contains at least the copolymer of the present invention. In the case where the photosensitive layer is not the surface layer, another resin may be used instead of the copolymer of the present invention. transporting layer has preferably a film thickness ranging from 5 to 40 μm, more preferably from 10 to 30 μm.

A protecting layer may be provided on the photosensitive layer in the present invention to protect the photosensitive layer against adverse mechanical, chemical or electrical effect from the outside. The protecting layer contains at least the copolymer of the present invention, and may further contain another resin as mentioned above. The protecting layer may be composed of a resin only, or may contain the aforementioned charge-transporting substance or an electroconductive substance like electroconductive powdery materials for the purpose of lowering the residual potential. The electroconductive powdery material includes powder, flakes, and short fibers of metals such as aluminum, copper, nickel, and silver; electroconductive metal oxides such as antimony oxide, indium oxide, and tin oxide; electroconductive polymer materials such as polypyrrole, polyaniline, and polyelectrolyte; carbon black, carbon fiber, powdery graphite, organic and inorganic electrolytes, and electroconductive powdery material coated with the above electroconductive substance. The thickness of the protecting layer is decided in consideration of the electrophotographic properties and durability, and is preferably in a range of from 0.2 to 15 μm, more preferably from 0.5 to 15 pm.

A subbing layer which has both a barrier function and an adhesive function may be provided between the electroconductive support and the photosensitive layer in the present invention. The material for the subbing layer includes casing, polyvinyl alcohol, nitrocellulose, ethylene-acrylate copolymer, polyvinylbutyral, phenol resins, polyamides (including nylon 6, nylon 66, nylon 610 copolymer nylon, and alkoxymethylated nylon), polyurethane, gelatin, aluminum oxide, and so forth. The thickness of the subbing layer is preferably in a range of from 0.1 to 10 μm, more preferably from 0.1 to 5 μm.

Further, in the present invention, an electroconductive layer may be formed between the support and the photosensitive layer, or between the support and the subbing layer for the purposes of coating surface defects of the support or preventing occurrence Of interference fringe especially when laser beam is employed for image input. This electroconductive layer may be formed by dispersing in a suitable resin a powdery electroconductive material such as carbon black, particulate metals, particulate metal oxides, applying the liquid dispersion, and drying it. The thickness of the electroconductive layer is preferably in a range of from 5 to 40 μm, more preferably from 1O to 30 μm.

The above mentioned various layers may be applied by a coating method such as dip coating, spray coating, spinner coating, bead coating, blade coating, beam coating, and so forth.

The electroconductive support employed in the present invention may be made from a material which is electroconductive by itself such as aluminum, aluminum alloys, copper, zinc, stainless steel, vanadium, molybdenum, chromium, titanium, nickel, indium, gold, and platinum; plastics or paper coated with an eleotroconductive layer prepared by vapor-depositing aluminum, aluminum alloys, indium oxide, tin oxide, indium oxide-tin oxide alloys, and the like; plastics or paper impregnated with electroconductive particles; plastics containing an electroconductive polymer; and the like.

The support may be in a drum shape, a sheet shape, a belt shape, or any other shape. The shape is selected to be most suitable for the eleotrophotographic apparatus employed.

The electrophotographic photosensitive member of the present invention is applicable to electrophotographic apparatuses generally such as copying machines, laser printers, LED printers, and liquid crystal shutter type printers, but it is also applicable widely to apparatuses for display recording, printing, engraving, facsimile, and so forth which utilize electrophotography techniques.

Figure 5:
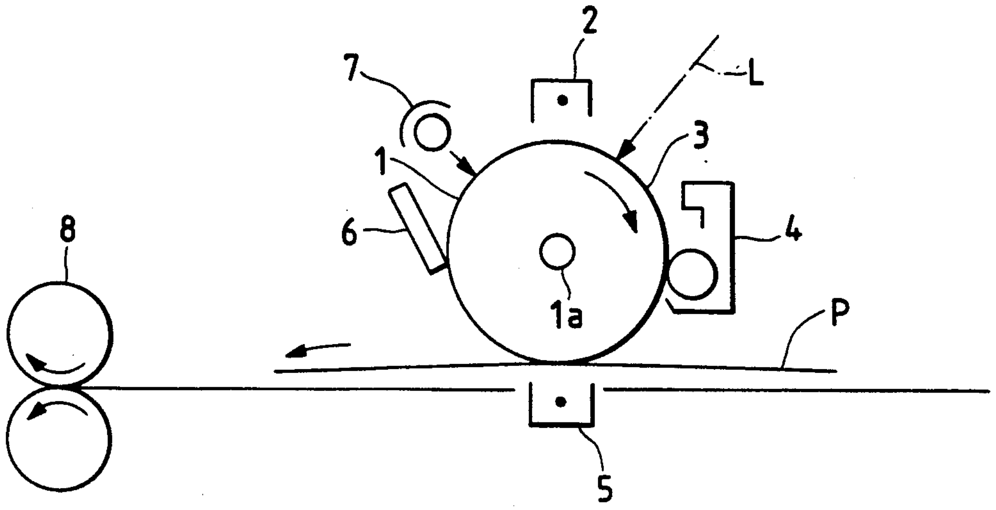
FIG. 5 shows schematically a constitution of an electrophotographic apparatus employing an electrophotographic photosensitive member of the present invention.

FIG. 5 illustrates schematically an example of the constitution of a transfer type electro-photographic apparatus employing the ectrophotographic photosensitive member of the present invention.

In FIG. 5, an electrophotographic photosensitive member 1 of the present invention is driven to rotate around the axis 1*a* in the arrow direction at a prescribed peripheral speed. The photosensitive member 1 is uniformly charged with a predetermined, positive or negative potential at the peripheral face during the rotation by an electrostatic charging means 2, and then exposed to image-exposure light L (e.g. slit exposure, laser beam-scanning exposure, etc.) at the exposure portion 3 with an image-exposure means (not shown in the drawing). whereby electrostatic latent images are sequentially formed on the peripheral surface in accordance with the exposed image.

The electrostatic latent image is developed with a toner by a developing means 4. The toner-developed images are sequentially transferred by a transfer means 5 onto a surface of a transfer material P which is fed between the photosensitive member 1 and the transfer means 5 synchronously with the rotation of the photosensitive member 1 from a transfer material feeder not shown in the drawing.

The transfer material P having received the transferred image is separated from the photosensitive member surface, and introduced to an image fixing means 8 for fixation of the image and sent out of the copying machine as a duplicate copy.

The surface of the photosensitive member 1, after the image transfer, is cleaned with a cleaning means 6 to remove any remaining un-transferred toner, and is treated for charge elimination with a pre-exposure means 7 for repeated use for image formation.

The generally employed charging means 2 for uniformly charging the photosensitive member 1 is a corona charging apparatus. The generally employed transfer means 5 is also a corona charging means. In the electrophotographic apparatus, two or more of the constitutional elements of the above described photosensitive member, the developing means, the cleaning means, etc. may be integrated into one device unit, which may be made demountable from the main body of the apparatus. For example, at least one of the charging means, the developing means, and the cleaning means is combined with the photosensitive member 1 into one device unit which is demountable from the main body of the apparatus by aid of a guiding means such as a rail in the main body of the apparatus.

In the case where the electrophotographic apparatus is used as a copying machine or a printer, the optical image exposure light L may be projected onto the photosensitive member as reflected light or transmitted light from an original copy, or otherwise the information read out by a sensor from an original may be signalized, and light is projected, onto a photosensitive member, by scanning with a laser beam, driving an LED array, or driving a liquid crystal shutter array according to the signal.

Figure 6:
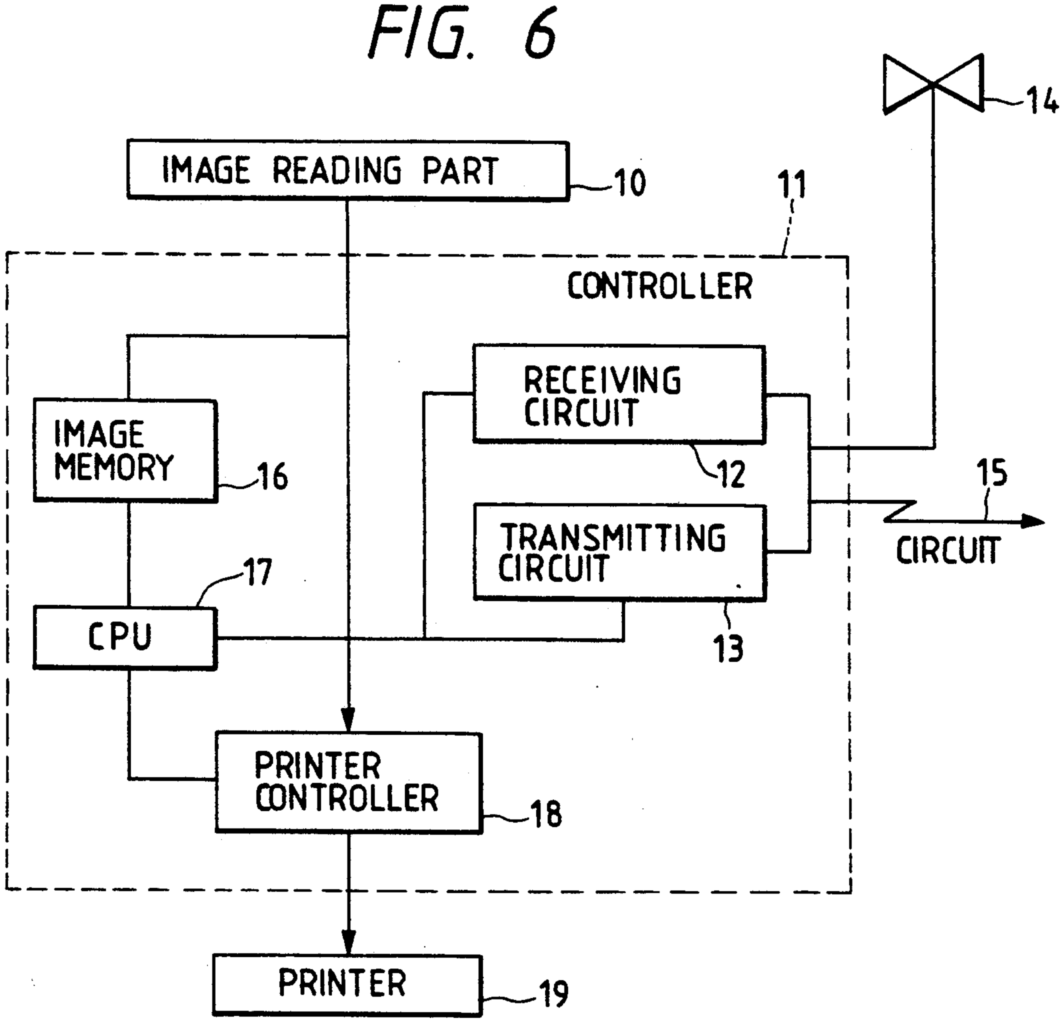
FIG. 6 shows an example of a block diagram of a facsimile system employing an electrophotographic photosensitive member of the present invention.

In the case where the electrophotographic apparatus is used as a printer of a facsimile machine, the optical image exposure light L is employed for printing the received data. FIG. 6 is a block diagram of an example of this case.

A controller 11 controls the image-reading part 10 and a printer 19. The entire of the controller 11 is controlled by a CPU 17. Readout data from the image reading part 10 is transmitted through a transmitting circuit 13 to the other communication station. Data received from the other communication station is transmitted through a receiving circuit 12 to a printer 19. The image data is stored in image memory 16. A printer controller 18 controls a printer 19. The numeral 14 denotes a telephone set.

The image received through a circuit 15, namely image information from a remote terminal connected through the circuit, is demodulated by the receiving circuit 12, treated for decoding of the image information in CPU 17, and successively stored in the image memory 16. When at least one page of image information has been stored in the image memory 16, the images are recorded in such a manner that the CPU 17 reads out the one page of image information, and sends out the decoded one page of information to the printer controller 18, which controls the printer on receiving the one page of information from CPU to record the image information.

During recording by the printer 19, the CPU 17 receives the subsequent page of information.

Images are received and recorded in the manner as described above.

The present invention is described in more detail by reference to Examples without limiting the invention in any way. In the Examples the term "parts" based on weight.

EXAMPLE 1

A paint for an electroconductive layer was prepared by mixing 50 parts of powdery titanium oxide coated with tin oxide containing 10 % antimony oxide, parts of resol type phenol resin, 20 parts of methylcellosolve, 5 parts of methanol, and 0.002 parts of silicone oil (polydimethylsiloxane-polyoxyalkylene copolymer, having weight-average molecular weight of 3,000) by means of a sand mill employing glass beads of 1 mm in diameter for 2.5 hours. The paint was applied on an aluminum cylinder (30 mm in diameter and mm in length) by dipping. The applied paint was dried at 130° C. for 30 minutes to form an electroconductive layer of 20 μm thick.

On this electroconductive layer, a subbing layer was formed in a thickness of 1 μm by applying a solution prepared by dissolving 5 parts of 6-66-610-12 quaternary polyamide copolymer in a mixed solvent consisting of 70 parts of methanol and 25 parts of butanol by dipping, and drying the applied solution.

Four parts of A type oxytitanium phthalocyanine crystal and 2 parts of polyvinylbutyral were added to 95 parts of cyclohexanone, and the mixture was dispersed by means of a sand mill employing glass beads of 1 mm in diameter for one hour, and the resulting dispersion was diluted with parts of methyl ethyl ketone. The liquid thus prepared was applied on the above subbing layer and dried at 80° C. for 10 minutes to form a charge-generating layer 0.2 mm thick.

Subsequently, 10 parts of the charge-transporting substance having the structure represented by the formula below:

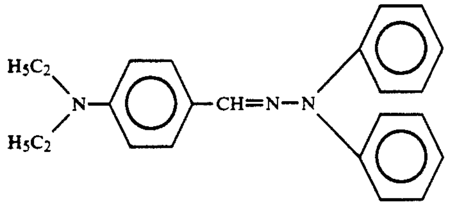

and 10 parts of the copolymer having the structure represented by the formula below (viscosity-average molecular weight: $2.2\times10^4$):

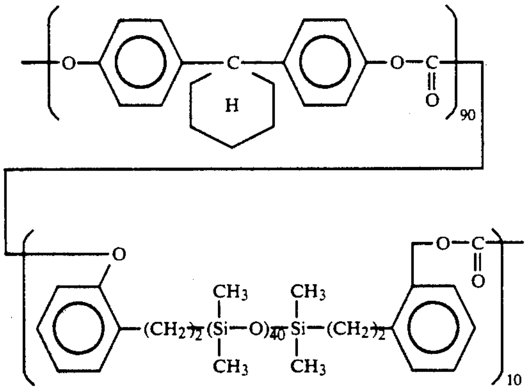

were dissolved in 60 parts of chlorobenzene. This solution was applied on the charge-generating layer prepared above by dip coating, and the applied matter was dried at 110° C. for one hour to form a charge-transporting layer 21 μm thick.

The resulting electrophotographic photosensitive member was mounted on a laser beam printer (trade name LBP-SX, made by Canon K.K.). Electrification conditions were set to give the dark area potential of −700 V. Thereto, laser light of 802 nm was irradiated, and the quantity of light necessary for lowering the potential from −700 V to −150 V was determined as a measure of the sensitivity E. Under the electrification conditions for the dark area potential of −700 V and the light area potential of −150 V, and at a high temperature of 35° C. and high humidity of 80 %, 10,000 sheets of continuous copying was conducted to test the durability. After the 10,000-sheet copying test, the change of the light area potential ΔVL was determined, and the quality of the image was evaluated visually.

The results are shown in Table I. In the table, the symbol ○ shows that the image quality is excellent with only little black dots; the symbol Δ shows that the image quality is practically satisfactory in spite of occurrence of black dots; and the symbol x shows that the image quality is practically not useful with conspicuous black dots. The positive sign regarding the value of ΔVL means the increase of the absolute value of the potential.

EXAMPLES 2 TO 4

Electrophotographic photosensitive members were prepared and evaluated in the same manner as in Example 1 except that the crystal form of the oxytitanium phthalocyanine was changed to B type, Y type, and I type respectively. The results are shown in Table 1.

COMPARATIVE EXAMPLES 1 TO 4

For comparison, electrophotographic photosensitive members were prepared and evaluated in the same manner as in Examples 1 to 4 except that the copolymer for the charge-transporting layer was changed respectively to polycarbonate Z (viscosity-average molecular weight: $3.5\times10^4$). The results are shown in Table 1.

EXAMPLES 5 TO 11

Electrophotographic photosensitive members were prepared and evaluated in the same manner as in Example 4 except that the copolymer for the charge-transporting layer was changed to the copolymer having the structure shown below:

(Copolymer for Charge-Transporting Layer Employed in Example 5, Viscosity-Average Molecular Weight: $2.5\times10^4$)

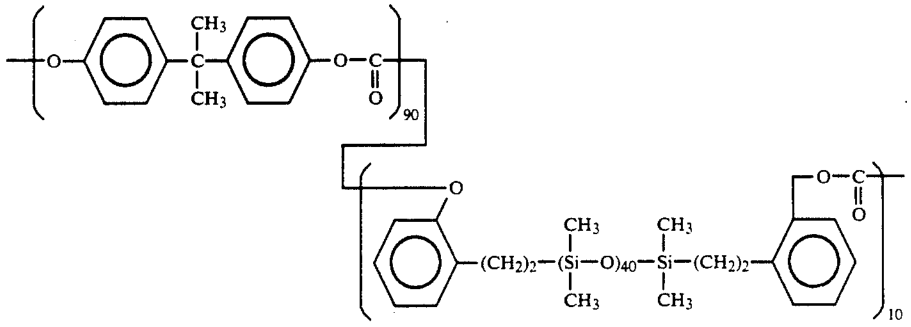

-continued (Copolymer for Charge-Transporting Layer Employed in Example 6, Viscosity-Average Molecular Weight: 3.0 × $10^4$)

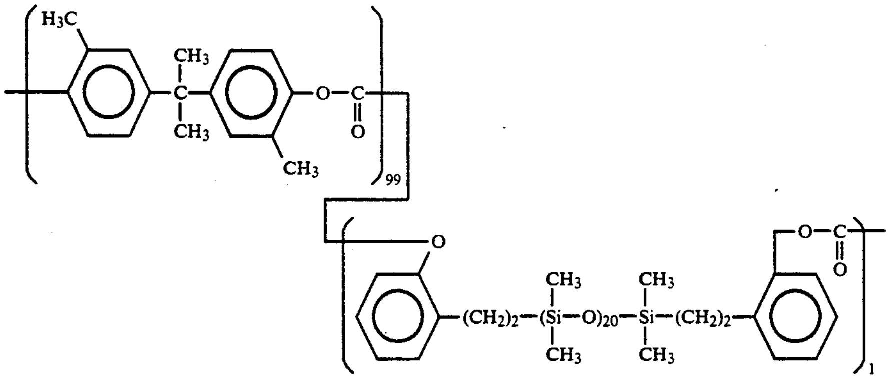

(Copolymer for Charge-Transporting Layer Employed in Example 7, Viscosity-Average Molecular Weight: 2.7 × $10^4$)

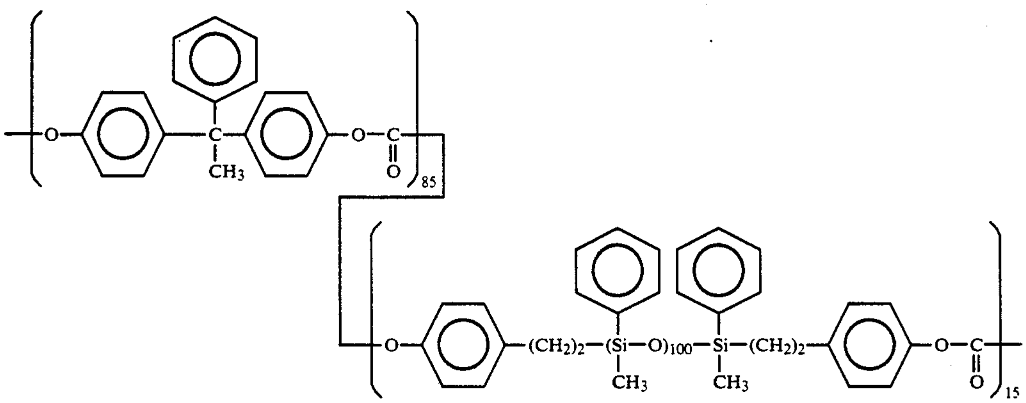

(Copolymer for Charge-Transporting Layer Employed in Example 8, Viscosity-Average Molecular Weight: 3.2 × $10^4$)

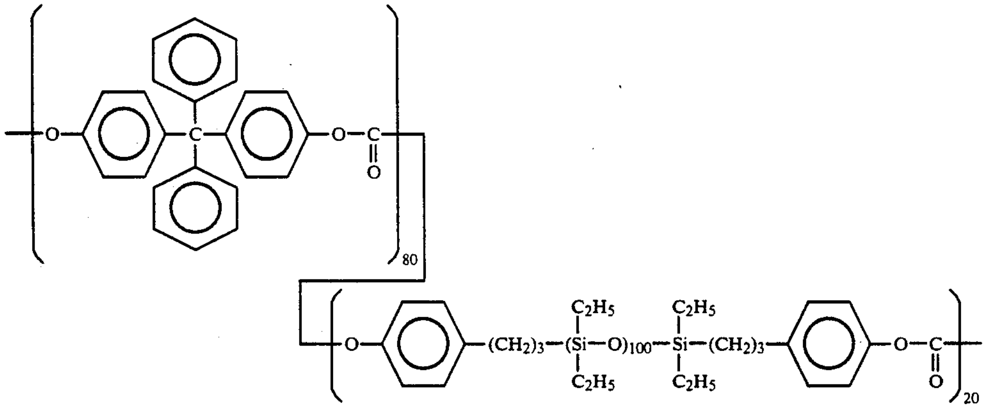

(Copolymer for Charge-Transporting Layer Employed in Example 9, Viscosity-Average Molecular Weight: 2.1 × $10^4$)

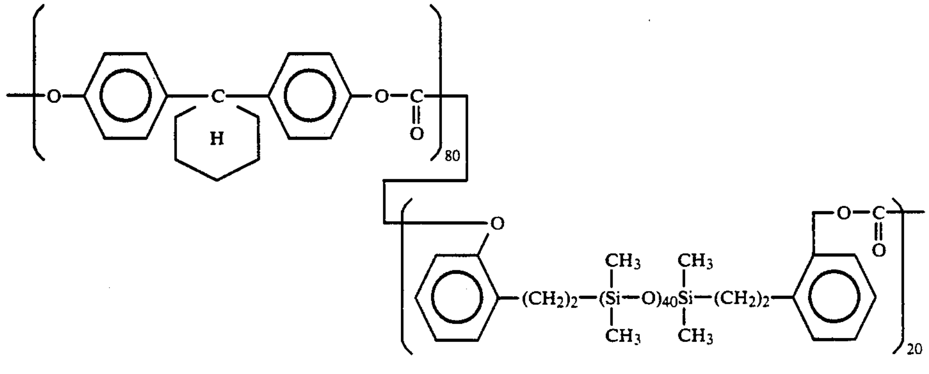

-continued (Copolymer for Charge-Transporting Layer Employed in Example 10, Viscosity-Average Molecular Weight: 4.0 × $10^4$)

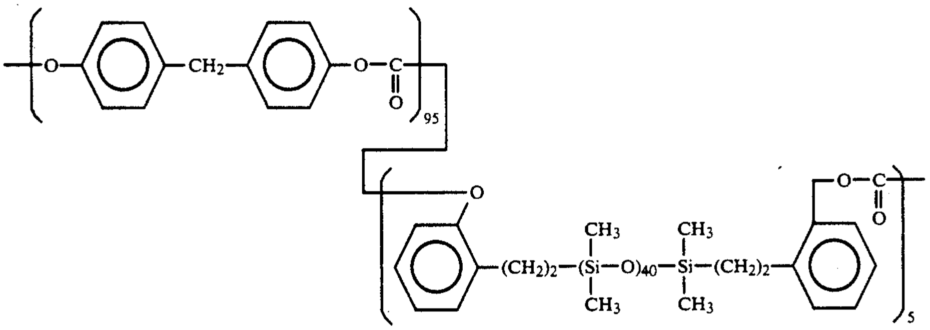

(Copolymer for Charge-Transporting Layer Employed in Example 11, Viscosity-Average Molecular Weight: 2.0 × $10^4$)

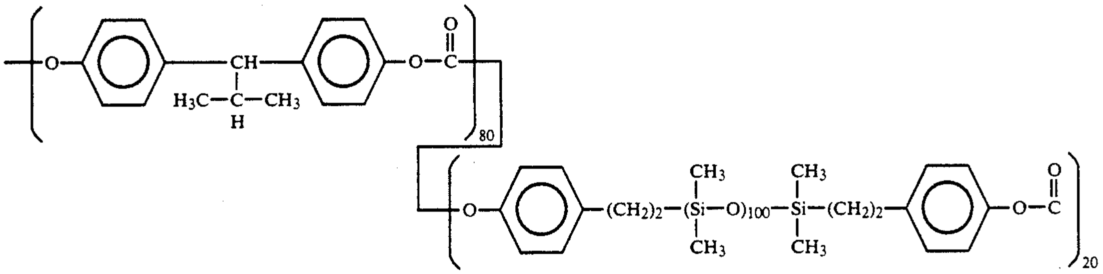

COMPARATIVE EXAMPLE 5

An electrophotographic photosensitive member was prepared and evaluated in the same manner as in Example 4 except that the copolymer for the charge-transporting layer was changed to polycarbonate A (viscosity-average molecular weight: $3.6\times10^4$). The results are shown in Table 1.

TABLE 1

| | Crystal form of oxytitanium phthalocyanine | E ($\mu J/cm^2$) | ΔVL (V) | Image quality |
|---|---|---|---|---|
| Example | | | | |
| 1 | Type A | 0.55 | +50 | O |
| 2 | Type B | 0.57 | +40 | O |
| 3 | Type Y | 0.30 | +30 | O |
| 4 | Type I | 0.24 | +20 | O |
| Comparative Example | | | | |
| 1 | Type A | 0.52 | +140 | X |
| 2 | Type B | 0.57 | +130 | Δ |
| 3 | Type Y | 0.28 | +100 | X |
| 4 | Type I | 0.26 | +90 | Δ |
| Example | | | | |
| 5 | Type I | 0.27 | +30 | O |
| 6 | Type I | 0.24 | +35 | O |
| 7 | Type I | 0.25 | +35 | O |
| 8 | Type I | 0.23 | +50 | O |
| 9 | Type I | 0.24 | +20 | O |
| 10 | Type I | 0.25 | +35 | O |
| 11 | Type I | 0.29 | +25 | O |
| Comparative Example | | | | |
| 5 | Type I | 0.27 | +210 | X |

EXAMPLES 12 TO 15

Electrophotographic photosensitive members were prepared and evaluated in the same manner as in Examples 1 to 4 except that the charge-transporting substance was changed to the compound shown below:

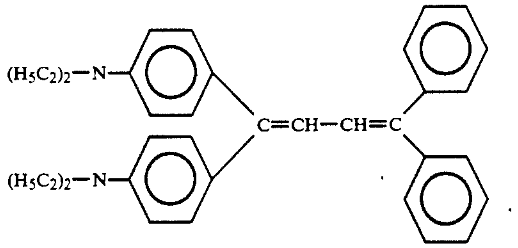

The results are shown in Table 2. The symbol "O" means the same as in Table 1.

TABLE 2

| | Crystal form of oxytitanium phthalocyanine | E ($\mu J/cm^2$) | ΔVL (V) | Image quality |
|---|---|---|---|---|
| Example 12 | Type A | 0.65 | +55 | O |
| Example 13 | Type B | 0.62 | +70 | O |
| Example 14 | Type Y | 0.29 | +35 | O |
| Example 15 | Type I | 0.28 | +30 | O |

As described above, the eleotrophotographic photosensitive member of the present invention has excellent sensitivity characteristics giving satisfactory image without occurrence of black dots even at a high temperature and a high humidity, and giving the remarkable effect of an extremely small change during continuous repetition of printing. The eleotrophotographic apparatus, the device unit, and the facsimile machine employing the electrophotographic photosensitive member of the present invention give the same effect as above.

What is claimed is:

1. An electrophotographic photosensitive member, comprising an electroconductive support and a photosensitive layer formed thereon, the photosensitive layer containing oxytitanium phthalocyanine, and a surface layer of the photosensitive member containing a copolymer having a first structural unit represented by the structural formula [I]:

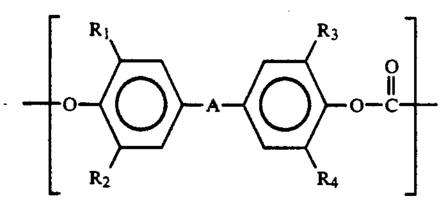

[I]

where A is a linear, branched or cyclic alkylidene group, an aryl-substituted alkylidene group, an —CO—, —SO—, or —SO—, the alkylidene group having 1 to 10 carbon atoms; $R_1$, $R_2$, $R_3$, and $R_4$ are each hydrogen, halogen, or an alkyl or alkenyl group having 1 to 4 carbon atoms, and a second structural unit [II]:

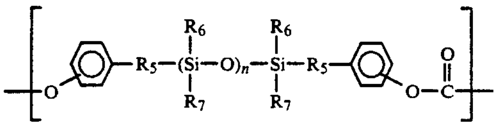

[II]

where R5 is an alkylene or alkylidene group having 2 to 6 carbon atoms; $R_6$ and $R_7$ are each an alkyl group having 1 to 3 carbon atoms, a phenyl group, or a substituted phenyl group; n is an integer of from 1 to 200.

2. An electrophotographic photosensitive member according to claim 1, wherein the oxytitanium phthalocyanine is in at least one crystal form selected from the group consisting of an A type, a B type, a Y type, and an I type of crystal forms.

3. An electrophotographic photosensitive member according to claim 2, wherein the oxytitanium phthalocyanine is in an I type crystal form.

4. An electrophotographic photosensitive member according to claim 1, wherein the second structural unit represented by Formula [II] is contained in an amount of from 0.1 to 50 % by weight based on the total weight of the copolymer.

5. An electrophotographic photosensitive member according to claim 1, wherein the first structural unit of Formula [I] is represented by the formula below:

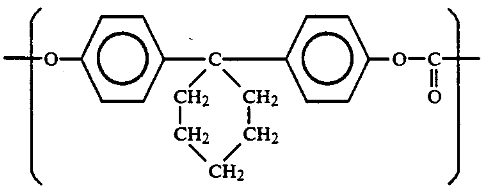

6. An electrophotographic photosensitive member according to claim 1, wherein the first structural unit of Formula [I] is represented by the formula below:

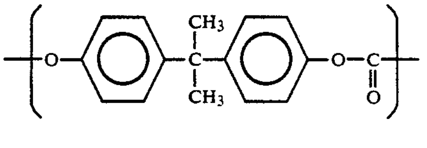

7. An electrophotographic photosensitive member according to claim 1, wherein the first structural unit of Formula [I] is represented by the formula below:

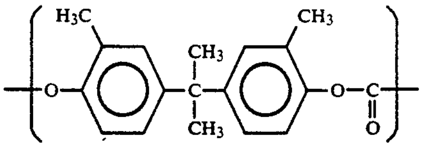

8. An electrophotographic photosensitive member according to claim 1 wherein the first structural unit of Formula [I] is represented by the formula below:

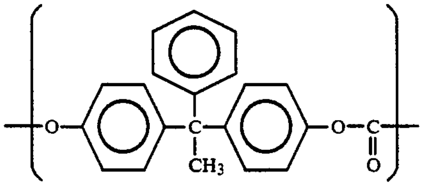

9. An electrophotographic photosensitive member according to claim 1, wherein the first structural unit of Formula [I] is represented by the formula below:

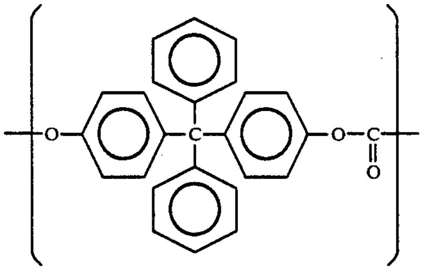

10. An electrophotographic photosensitive member according to claim 1, wherein the copolymer has a viscosity-average molecular weight in a range of from 10,000 to 100,000.

11. An electrophotographic photosensitive member according to claim 10, wherein the copolymer has a viscosity-average molecular weight in a range of from 20,000 to 40,000.

12. An electrophotographic photosensitive member according to claim 1, wherein $R_5$ in Formula [II]is selected from the group consisting of ethylene, propylene, and isopropylene.

13. An electrophotographic photosensitive member according to claim 1, wherein the photosensitive layer comprises a charge-generating layer and a charge-transporting layer.

14. An electrophotographic photosensitive member according to claim 13, wherein the electrophotographic photosensitive member has an electroconductive support, a charge-generating layer, and a charge transporting layer in the order named.

15. An electrophotographic photosensitive member according to claim 14, wherein the charge-transporting layer contains the copolymer having the structural unit represented by Formulas [I] and [II].

16. An electrophotographic photosensitive member according to claim 13, wherein the eleotrophotographic photosensitive member has an electroconductive support, a charge-transporting layer, and a charge-generating layer in the order named.

17. An electrophotographic photosensitive member according to claim 16, wherein the charge-generating layer contains the copolymer having the structural unit represented by Formulas [I] and [II].

18. An electrophotographic photosensitive member according to claim 1, wherein the photosensitive layer is a single layer.

19. An electrophotographic photosensitive member according to claim 1, wherein the surface layer is a protecting layer.

20. An eleotrophotographic photosensitive member according to claim 1, wherein the electrophotographic photosensitive member has a subbing layer between the electroconductive support and the photosensitive layer.

21. An electrophotographic apparatus, comprising an electrophotographic photosensitive member, an image forming means for forming an electrostatic latent image, a developing means for developing the formed latent image, and a transferring means for transferring a developed image to a transfer-receiving material, said electrophotographic photosensitive member comprising an electroconductive support and a photosensitive layer formed thereon, the photosensitive layer containing oxytitanium phthalocyanine, and a surface layer of the photosensitive member containing a copolymer having a first structural unit represented by the structural formula [I]:

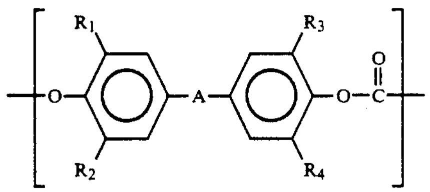

[I]

where A is a linear, branched or cyclic alkylidene group, an aryl-substituted alkylidene group, an arylene-dialkylidene group, or a group of —O—, —S—, —CO—, —SO—, or —$SO_2$—, the alkylidene group having 1 to 10 carbon atoms; $R_1$, $R_2$, $R_3$, and $R_4$ are each hydrogen, halogen or an alkyl or alkenyl group having 1 to 4 carbon atoms, and a second structural unit [II]:

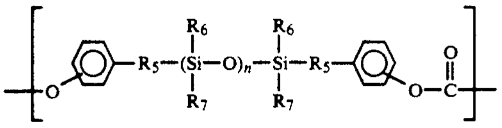

[II]

$R_5$ is an alkylene or alkylidene group having 2 to 6 carbon atoms; $R_6$ and $R_7$ are each an alkyl group having 1 to 3 carbon atoms, a phenyl group, or a substituted phenyl group; n is an integer of from 1 to 200.

22. An electrophotographic apparatus according to claim 21 wherein the oxytitanium phthalocyanine is in at least one crystal form selected from the group consisting of an A type, a B type, a Y type, and an I type of crystal forms.

23. An electrophotographic apparatus according to claim 21, wherein the oxytitanium phthalocyanine is in an I type crystal form.

24. An electrophotographic apparatus according to claim 21, wherein the second structural unit represented by Formula [II] is contained in an amount of from 0.1 to 50 % by weight based on the total weight of the copolymer.

25. A device unit comprising an electrophotographic photosensitive member, a charging means, a developing means, and a cleaning means, said electrophotographic photosensitive member comprising an electroconductive support and a photosensitive layer formed thereon, the photosensitive layer containing oxytitanium phthalocyanine, and a surface layer of the photosensitive member containing a copolymer having a first structural unit represented by the structural formula [I]:

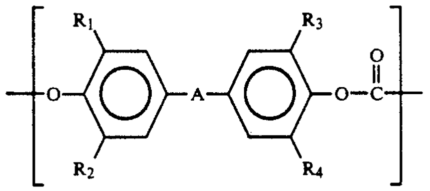

[I]

where A is a linear, branched or cyclic alkylidene group, an aryl-substituted alkylidene group, an arylene-dialkylidene group, or a group of —O—, —S—, —CO—, —SO—, or —$SO_2$—, the alkylidene group having 1 to 10 carbon atoms; $R_1$, $R_2$, $R_3$, and $R_4$ are each hydrogen, halogen, or an alkyl or alkenyl group having 1 to 4 carbon atoms, and a second structural unit [II]:

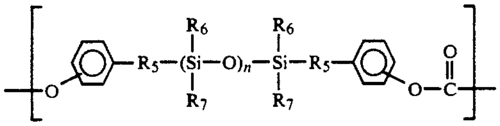

[II]

where $R_5$ is an alkylene or alkylidene group having 2 to 6 carbon atoms; $R_6$ and $R_7$ are each an alkyl group having 1 to 3 carbon atoms, a phenyl group, or a substituted phenyl group; n is an integer of from 1 to 200, and said unit holding integrally the electrophotographic photosensitive member and at least one means selected from a charging means, a developing means, and a cleaning means, and being demountable from the main body of an electrophotographic apparatus.

26. A device unit according to claim 25, wherein the oxytitanium phthalocyanine is in at least one crystal form selected from the group consisting of an A type, a B type, a Y type, and an I type of crystal forms.

27. A device unit according to claim 25, wherein the oxytitanium phthalocyanine is in an I type crystal form.

28. A device unit according to claim 25, wherein the second structural unit represented by Formula [II] is contained in an amount of from 0.1 to 50 % by weight based on the total weight of the copolymer.

29. A facsimile machine comprising an electrophotographic apparatus and an information-receiving means for receiving image information from a remote terminal, said electrophotographic apparatus comprising an electrophotographic photosensitive member, said electrophotographic photosensitive member comprising an electroconductive support and a photosensitive layer formed thereon, the photosensitive layer containing oxytitanium phthalocyanine, and a surface layer of the photosensitive member containing a copolymer having a first structural unit represented by the structural formula [I]:

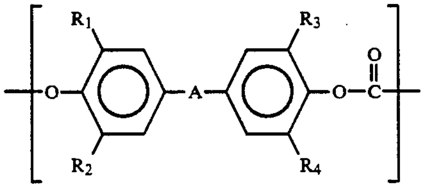
[I]

where A is a linear, branched or cyclic alkylidene group, an aryl-substituted alkylidene group, an arylene-dialkylidene group, or a group of —O—, —S—, —CO—, —SO—, or —$SO_2$—, the alkylidene group having 1 to 10 carbon atoms; $R_1$, $R_2$, $R_3$, and $R_4$ are each hydrogen, halogen, or an alkyl or alkenyl group having 1 to 4 carbon atoms, and a second structural unit [II]:

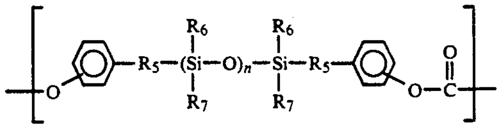
[II]

where $R_5$ is an alkylene or alkylidene group having 2 to 6 carbon atoms; $R_6$ and $R_7$ are each an alkyl group having 1 to 3 carbon atoms, a phenyl group, or a substituted phenyl group; n is an integer of from 1 to 200.

30. A facsimile machine according to claim 29, wherein the oxytitanium phthalocyanine is in at least one crystal form selected from the group consisting of an A type, a B type, a Y type, and an I type of crystal forms.

31. A facsimile machine according to claim 29, wherein the oxytitanium phthalocyanine is in an I type crystal form.

32. A facsimile machine according to claim 29, wherein the second structural unit represented by Formula [II] is contained in an amount of from 0.1 to 50 % weight based on the total weight of the copolymer.

* * * * *

UNITED STATES PATENT AND TRADEMARK OFFICE

CERTIFICATE OF CORRECTION

PATENT NO. : 5,246,807

DATED : September 21, 1993

INVENTOR(S) : TETSURO KANEMARU, ET AL.

It is certified that error appears in the above-indentified patent and that said Letters Patent is hereby corrected as shown below:

COLUMN 1

Line 58, "usual." should read --conventional.--.

COLUMN 2

Line 24, "and which" should read --and-- and "and causes" should read --and which causes--.
Line 29, "vides" should read --vide--.
Line 53, "or –SO–," should read --or $-SO_2-$,--.
Line 61, "$-R_6-$" should read -- $-R_5-$ --.

COLUMN 3

Formula [I], "$R_2$" should read --$R_3$--.

Line 48, "–O–," should read -- –O–,--.
Line 50, "10" should read --10--.
Formula [II], "$-R_6-(Si-O)_n-S_i-R_6-$" should read -- $-R_5-(Si-O)_n-S_i-R_5-$ --.

COLUMN 4

Line 15, "$(X_3)_g$" should read --$(X_3)_q$ --.
Line 22, "known" should read --known crystalline oxytitanium phthalocyanine may be used. From--.
Line 32, "Laid" should read --Laid- --.
Line 47, "he" should read --the--.

COLUMN 5

Line 15, "100." should read --100.--.

UNITED STATES PATENT AND TRADEMARK OFFICE

CERTIFICATE OF CORRECTION

PATENT NO. :5,246,807

DATED :September 21, 1993

INVENTOR(S) :TETSURO KANEMARU, ET AL.

It is certified that error appears in the above-indentified patent and that said Letters Patent is hereby corrected as shown below:

COLUMN 8

Line 31, "of" should be deleted.

COLUMN 9

Line 38, "$10^4$)" should read --$10^4$),--.

COLUMN 11

Line 20, "Containing" should read --containing--.

COLUMN 12

Line 18, "invention. transporting" should read --invention. The resin includes those mentioned above. The charge-transporting--.
Line 44, "15 pm." should read --15 μm.--.
Line 50, "casing." should read --casein,--.
Line 53, "610" should read --610,--.
Line 62, "Of" should read --of--.

COLUMN 13

Line 2, "10" should read --10--.
Line 32, "ectrophotographic" should read --electrophotographic--.
Line 44, "ing)." should read --ing),--.

COLUMN 14

Line 28, "entire" should read --entirety--.
Line 47, "printer" should read --printer 19--.

UNITED STATES PATENT AND TRADEMARK OFFICE

CERTIFICATE OF CORRECTION

PATENT NO. : 5,246,807

DATED : September 21, 1993

INVENTOR(S) : TETSURO KANEMARU, ET AL.

It is certified that error appears in the above-indentified patent and that said Letters Patent is hereby corrected as shown below:

COLUMN 14

Line 48, "CPU" should read --CPU 17--.
Line 56, "based" should read --is based--.
Line 62, "parts" should read --25 parts--.

COLUMN 15

Line 1, "and mm" should read --and 260 mm--.

COLUMN 16

Line 16, "10,000" should read --10,000--.
Line 18, "10,000-sheet" should read --10,000-sheet--.
Line 25, "x" should read --X--.

COLUMN 20

Example 11, " 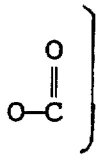 " should read -- 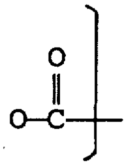 --.

Line 53, "eleotrophotographic" should read --electrophotographic--.
Line 59, "eleotrophotographic" should read --electrophotographic--.

COLUMN 21

Line 15, "an —CO—," should read --an arylene-dialkylidene group, or a group of —O—, —S—, —CO—,--.
Line 16, "or —SO—," should read --or $-SO_2-$,--.
Line 28, "R5" should read --$R_5$--.

UNITED STATES PATENT AND TRADEMARK OFFICE

CERTIFICATE OF CORRECTION

PATENT NO. : 5,246,807

DATED : September 21, 1993

INVENTOR(S) : TETSURO KANEMARU, ET AL.

It is certified that error appears in the above-indentified patent and that said Letters Patent is hereby corrected as shown below:

COLUMN 22

Line 51, "[II]is" should read --[II] is--.
Line 68, "eleotrophotographic" should read --electrophotographic--.

COLUMN 23

Line 14, "eleotrophotographic" should read --electrophotographic--.
Line 59, "$R_5$" should read --where $R_5$--.

COLUMN 26

Line 27, "weight" should read --by weight--.

Signed and Sealed this

Twenty-first Day of June, 1994

Attest:

BRUCE LEHMAN

Attesting Officer

Commissioner of Patents and Trademarks